(12) United States Patent
Winarski (10) Patent No.: US 9,891,380 B1
(45) Date of Patent: Feb. 13, 2018

(54) GRAPHENE OPTIC FIBER

(71) Applicant: Tyson York Winarski, Mountain View, CA (US)

(72) Inventor: Tyson York Winarski, Mountain View, CA (US)

( * ) Notice: Subject to any disclaimer, the term of this patent is extended or adjusted under 35 U.S.C. 154(b) by 0 days.

(21) Appl. No.: 15/401,084

(22) Filed: Jan. 8, 2017

(51) Int. Cl.
  *G02B 6/032* (2006.01)
  *D01F 11/10* (2006.01)
  *G01J 1/42* (2006.01)

(52) U.S. Cl.
  CPC .............. *G02B 6/032* (2013.01); *D01F 11/10* (2013.01); *G01J 1/429* (2013.01); *G02B 2006/0325* (2013.01)

(58) Field of Classification Search
  None
  See application file for complete search history.

(56) References Cited

U.S. PATENT DOCUMENTS

| | | | |
|---|---|---|---|
| 2009/0068470 A1* | 3/2009 | Choi | B82Y 30/00 428/403 |
| 2009/0155161 A1* | 6/2009 | Yoon | B82Y 30/00 423/448 |
| 2015/0255945 A1* | 9/2015 | Winarski | H01S 3/06716 372/6 |
| 2016/0116407 A1* | 4/2016 | Ben-Zion | G02B 6/262 250/227.11 |

* cited by examiner

*Primary Examiner* — Sung Pak
(74) *Attorney, Agent, or Firm* — The Winarski Firm, PLLC (57) ABSTRACT

A deep-UV optical circuit includes a laser emitting light wavelengths (λ) below 250 nm. The circuit also includes a graphene optical cable formed of an optic core formed of a gas or vacuum having an index of refraction ranging between 1.000 and 1.002 and a cladding layer formed of a graphene cylinder made of a contiguous lattice of covalently-bonded carbon atoms surrounding the optic core. The circuit also includes an optical detector circuit configured to detect the light. The graphene optical cable optically couples the laser to the optical detector circuit, where the optical cable transmits light wavelengths (λ) below 250 nm as graphene has an index of refraction less than 1 for light wavelengths (λ) below 250 nm.

18 Claims, 8 Drawing Sheets

GRAPHENE OPTIC FIBER

BACKGROUND

First isolated in a lab in 2004, graphene has become the subject of an intense amount of scientific and industrial research seeking to capitalize on its unique and substantial optical and electrical properties. Graphene is formed of a monolayer of carbon atoms arranged in a hexagonal lattice. Graphene is highly flexible, yet has the strength hundreds of times that of steel and hardness of diamonds. Graphene is nearly transparent, but also efficiently conducts electricity and heat. Graphene exhibits ultrafast response over a broad spectral range along with significantly high nonlinearity.

Graphene's optical properties make it highly desirable for novel devices in the fields of optical wavelength converters, optical broadband polarizers, ultra short pulse generation, optical modulation, broadband nonlinear saturable absorbers in fiber lasers, and optical limiters. In addition, the fact that graphene exhibits both unique electrical and optical properties have opened the door for novel devices where the optical properties of the graphene are controlled through electrical signals.

Optical fibers are a key component of many of these novel graphene optical devices. When applied to optical fibers, graphene has been primarily applied to the optical fiber end face, or close to the optical fiber core along the length of the fiber in the direction of light propagation such as with D-shaped optical fibers or tapered fiber segments. When graphene is applied near the fiber core in the direction of light propagation, the light and graphene interaction occurs though an evanescent light field.

A variety of unique applications require the use of optical fibers that operate in the deep-ultraviolet (UV) spectrum. Deep-UV optical fibers are particularly useful for detection of proteins and drugs through fluorescence detection. Deep-UV optical fibers are also useful for laser delivery in medical procedures such as laser eye surgery. Deep-UV optical fibers also prove useful for bio-chemical analysis, UV spectroscopy, industrial chemical sensing, materials analysis and processing, lithography and UV laser marking/machining. In addition, deep-UV optical fibers hold promise for optical interconnect for electronic device communications between racked devices, communications between chips, and intra-chip communication. Increasingly, metal interconnect limits the performance of electronic devices as transistors continue to grow smaller. Replacing metal interconnect with optical interconnect would provide the improved power, latency, and bandwidth performance to match the enhanced scaling of transistors. Recently, researchers integrated 70 million transistors and 850 optical components into a silicon processor. While infrared light is common for optical fiber data transmission, choosing light with much lower wavelength, such as deep-UV, would facilitate the use of optical fibers with smaller diameters, thereby enabling miniaturization of the optical interconnect along with the advanced scaling of transistors. Two factors support the use of deep-UV optical fiber data transmission for optical interconnect: the development of deep-UV light-emitting diodes, and the development of UV fiber core materials resistant to UV-induced attenuation, otherwise known as solarization. When considering these optical fiber applications focused on the deep-UV spectrum, it is important to note that graphene exhibits an index of refraction lower than that of silica in the deep-UV spectrum. The question becomes is it possible to fabricate an optical fiber that includes a graphene layer as cladding for deep-UV applications.

SUMMARY

A deep-UV optical circuit is disclosed in the present application that includes a laser emitting light wavelengths ($\lambda$) below 250 nm. The circuit also includes a graphene optical cable formed of an optic core formed of a gas or vacuum having an index of refraction ranging between 1.000 and 1.002 and a cladding layer formed of a graphene cylinder made of a contiguous lattice of covalently-bonded carbon atoms surrounding the optic core. The circuit also includes an optical detector circuit configured to detect the light. The graphene optical cable optically couples the laser to the optical detector circuit. The optical cable transmits light wavelengths ($\lambda$) below 250 nm as graphene has an index of refraction less than 1 for light wavelengths ($\lambda$) below 250 nm. The graphene cylinder has an inner diameter D that varies between 157 nm and 300 nm, where inner diameter $D \geq \lambda$ and $\lambda$ varies between 157 nm to 250 nm. Alternatively, the graphene cylinder has an inner diameter D between 200 nm and 250 nm, where inner diameter $D \geq \lambda$ and $\lambda$ varies between 200 nm to 250 nm. The gas that may optionally server as the core can be a natural gas, an elemental gas, a compound gas, an artificial gas, a synthetic gas, a noble gas, air, or a nitrogen gas. The graphene cylinder has a armchair, chiral, or zig-zag configuration. The contiguous lattice of covalently-bonded carbon atoms form a monolayer of graphene. Alternatively, the contiguous lattice of covalently-bonded carbon atoms form multilayer graphene having a thickness ranging from 0.345 nm to 1.100 nm.

An optical graphene fiber for deep-UV light is disclosed that includes an optic core formed of a gas or vacuum having an index of refraction between 1.000 and 1.002 and a cladding layer formed of a graphene cylinder made of a contiguous lattice of covalently-bonded carbon atoms surrounding the optic core. The graphene optical fiber transmits light wavelengths ($\lambda$) less than 250 nm as graphene has an index of refraction less than 1 for light wavelengths ($\lambda$) below 250 nm. The graphene cylinder has an inner diameter D between 157 nm and 300 nm, where inner diameter $D \geq \lambda$ and $\lambda$ varies between 157 nm to 250 nm. Alternatively, the graphene cylinder has an inner diameter D that varies between 200 nm and 250 nm, where inner diameter $D \geq \lambda$ and $\lambda$ varies between 157 nm to 250 nm. The gas optionally forming the core can be a natural gas, an elemental gas, a compound gas, an artificial gas, a synthetic gas, a noble gas, air, a nitrogen gas. The graphene cylinder has a armchair, chiral, or zig-zag configuration. The contiguous lattice of covalently-bonded carbon atoms form a monolayer of graphene. Alternatively, the contiguous lattice of covalently-bonded carbon atoms form multilayer graphene having a thickness ranging from 0.345 nm to 1.100 nm.

An optical graphene cable for deep-UV light is disclosed that includes an optic core formed of a gas or vacuum having an index of refraction between 1.000 and 1.002 and a cladding layer formed of a graphene capsule encapsulating the optic core on all sides. The optical cable transmits light wavelengths ($\lambda$) less than 250 nm as graphene has an index of refraction less than 1 for light wavelengths ($\lambda$) below 250 nm. The graphene capsule has an inner diameter D that varies between 100 nm and 300 nm, where inner diameter $D \geq \lambda$ and $\lambda$ varies between 100 nm to 250 nm. The gas optionally forming the core may be a natural gas, an elemental gas, a compound gas, an artificial gas, a synthetic gas, a noble gas, air, or a nitrogen gas. The graphene cylinder has a armchair, chiral, or zig-zag configuration. The graphene capsule is made of a contiguous lattice of covalently-bonded carbon atoms that form a monolayer of graphene. Alternatively, the graphene capsule is made of a contiguous lattice of covalently-bonded carbon atoms that form multi-layer graphene having a thickness ranging from 0.345 nm to 1.100 nm. The optical graphene fiber for deep-UV light may also include a laser, or laser diode emitting deep-UV light having wavelength (λ) varying between 100 nm and 250 nm and an optical detector circuit configured to detect the deep-UV light, where the graphene optical cable optically couples the laser to the optical detector circuit.

BRIEF DESCRIPTION OF THE DRAWINGS

The novel features that are considered characteristic of the invention are set forth with particularity in the appended claims. The invention itself; however, both as to its structure and operation together with the additional objects and advantages thereof are best understood through the following description of the preferred embodiment of the present invention when read in conjunction with the accompanying drawings, wherein:

DETAILED DESCRIPTION

A graphene optical fiber is disclosed. A graphene optical fiber is an optical waveguide that transmits light along its axis, by the process of total internal reflection. The graphene optical fiber includes a core surrounded by cladding. An optical signal is confined within the core of the graphene optical fiber when the core has a refractive index that is greater than that of the cladding. Graphene has a wavelength dependent index of refraction. Graphene has an index of refraction below 1 (one) for light signals having wavelengths below approximately 250 nm in the deep-UV spectrum. A vacuum has an index of refraction of 1 (one). Similarly, gasses have an index of refraction that are slightly greater than 1 (one). Thus, when carrying light signals having wavelengths below approximately 250 nm, a vacuum or a gas can function as an optical core with graphene as cladding. Together, a core formed of a vacuum or a gas and a graphene cylinder as cladding form the graphene optical fiber, also called a graphene optical cable. Graphene is an impermeable membrane to even the smallest atoms, thereby maintaining the atmosphere of a vacuum or gas within the graphene cladding. Graphene is a hexagonal lattice of carbon atoms that form an atomically contiguous sheet. Graphene is formed of an atomically contiguous lattice of covalently-bonded carbon atoms. Graphene sheet, also referred to as a graphene lattice, is a flat monolayer of carbon atoms that are tightly packed into a two-dimensional lattice. Graphene is 97.7% optically transparent. Graphene is an extremely strong material due to the covalent carbon-carbon bonds. It is desirable to utilize graphene lattices that are defect free as the presence of defects reduces the strength of the graphene lattice. The intrinsic strength of a defect free sheet of graphene 100 is 42 N/m, making it one of the strongest materials known. The strength of graphene is comparable to the hardness of diamonds. Graphene is also a highly flexible material. Multiple monolayers of graphene sheet can be grown on top of each other to create a multi-layer graphene sheet. Graphene exhibits a wavelength dependent index of refraction. It is therefore possible for graphene to function as a cladding layer in optic fiber applications when paired with an appropriate fiber optic core that has an index of refraction higher than that of graphene.

Figure 1:
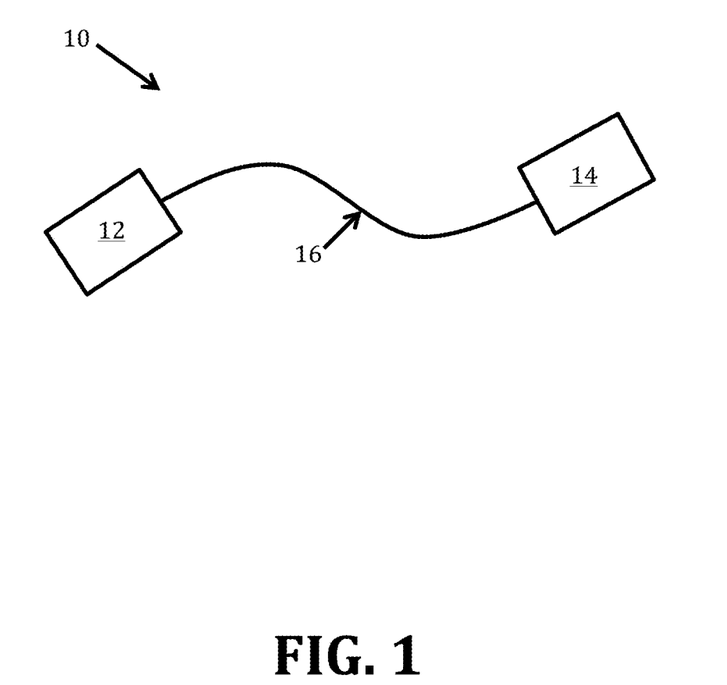
FIG. 1 illustrates a deep-UV optical circuit that includes a graphene optical cable.

FIG. 1 illustrates a basic deep-UV optical circuit 10 that includes a graphene optical cable 16. Graphene optical cable 16 is formed of a graphene cylinder that functions as a cladding layer and a core formed of a gas or a vacuum. Graphene optical cable 16 is connected to an optical transmitter 12 and an optical detector 14. Optical transmitter 12 emits deep-UV signals having a wavelength below 250 nm. UV wavelengths below 250 nm are primarily in the Ultra-Violet C (UVC) spectrum that runs from 100-280 nm. Optical transmitter 12 may be formed of a deep-UV laser that emits a light signal having a wavelength below approximately 250 nm. Deep-UV lasers that emit a light signal having a wavelength below approximately 250 nm are well known and exist in many varieties. For example, deep-UV lasers that emit deep-UV signals at 157 nm ($F_2$ excimer laser), 193 nm, 213 nm and 224 nm are known and commercially available. Optical transmitter 12 may be formed, for example, by as deep-UV laser diode, excimer laser, or any other type of laser that emits deep-UV signals below 250 nm. Optical transmitter 12 emits deep-UV light signals having a wavelength below 250 nm. These deep-UV light signals are emitted into graphene optical cable 16. Graphene optical cable 16 transmits the deep-UV optical signal from optical transmitter 12 to optical receiver 14 through total internal reflection of the deep-UV light signal within the graphene optical cable 16 due to the fact that the core of cable 16 formed of a gas or vacuum has a lower index of refraction than the graphene cylinder forming the cladding layer surrounding the core. The optical receiver 14 receives the transmitted deep-UV light signals. The deep-UV light signals are data which may be sent as a contiguous data stream, discretized into data packets with headers and cyclical redundancy check (CRC) information, and/or encoded via Error Correction Code (ECC) algorithms such as PRML (Partial Response, Maximum Likelihood) to facilitate transmission errors in the data. The data may be transmitted by optical transmitter 12 by varying the electrical power to the laser using PWM (pulse width modulated) or PPM (pulse position modulated) techniques, and the like. The optical receiver 14 may convert the light pulses to electrical signals via a phototransistor and the like. Basic deep-UV optical circuit 10 can be implemented in a variety of forms to facilitate the transmission of data from deep-UV light signal transmitters 12 to deep-UV light signal receivers 14 across graphene optical cables 16. For example, basic deep-UV circuit 10 can be implemented within a microchip to form an intrachip optical interconnect circuit. Basic deep-UV circuit 10 can also be implemented to form optical interconnect between different microchips. Basic deep-UV circuit 10 can also be implemented to form optical interconnect between different racked electronic devices. Increasingly, metal interconnect limits the performance of electronic devices as transistors continue to grow smaller. Replacing metal interconnect with optical interconnect that utilizes deep-UV signaling will greatly increase communication performance speeds within a microchip, between microchips, and between racked devices.

Figure 2:
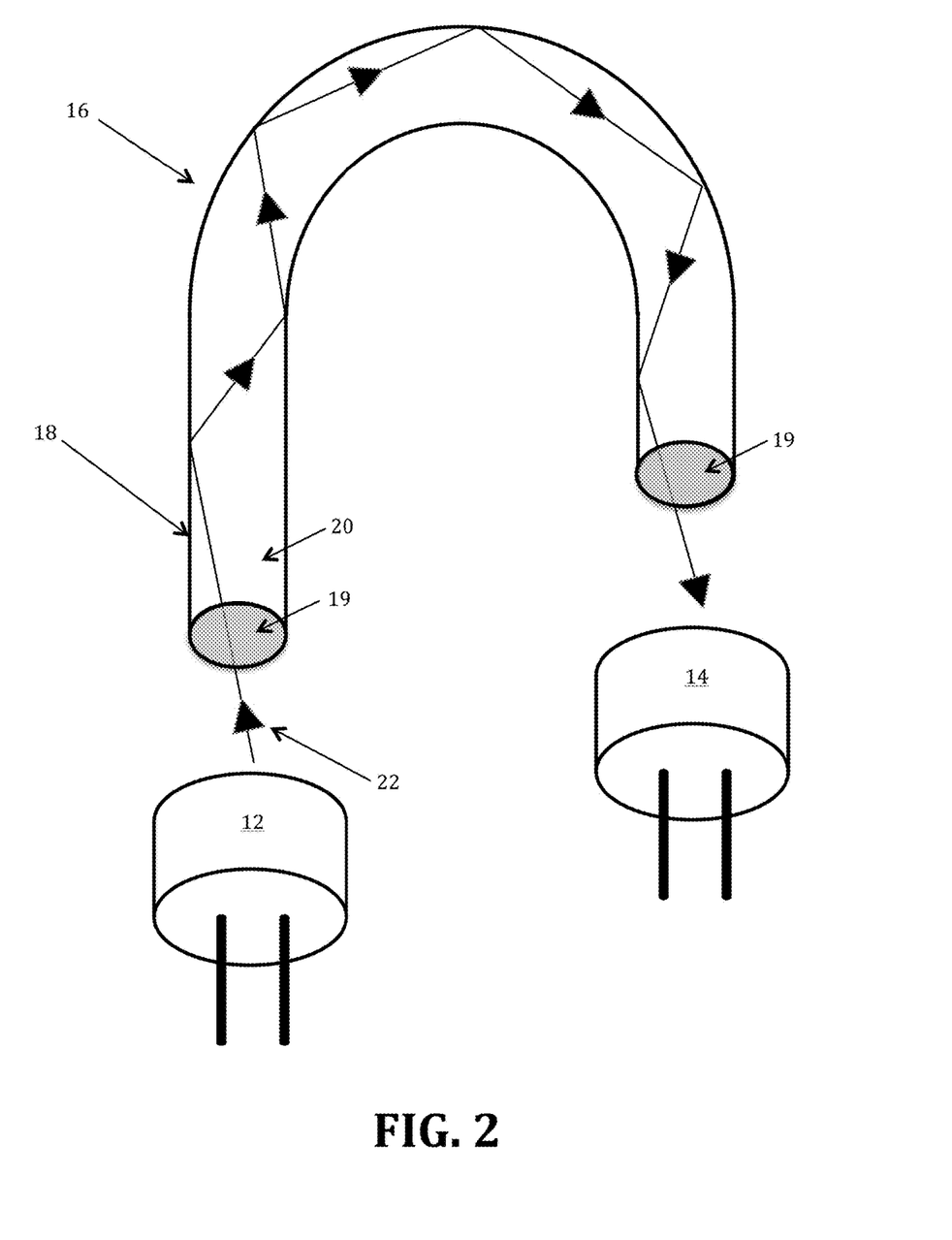
FIG. 2 illustrates an exploded view of a deep-UV optical circuit that includes a graphene optical cable having light refracted therein.

FIG. 2 illustrates an exploded view of a deep-UV optical circuit that includes a graphene optical cable 16 having a light signal 22 refracted therein. Graphene optical cable 16 optically connects a deep-UV optical transmitter 12 to a deep-UV optical receiver 14. Optical transmitter 12 is an electrical device that emits deep-UV light that has two wires extending from the base for receiving electrical signals. Optical transmitter 12 may be any kind of laser or light emitting diode that emits deep-UV signals having a wavelength below 250 nm. Graphene optical cable 16 optically connects optical transmitter 12 to optical receiver 14. Optical receiver 14 is an electrical device that detects deep-UV signals into electrical signals. Optical receiver 14 includes two wires extending from the back for receiving electrical signals. Graphene optical cable 16 is formed of a graphene cylinder 18 that contains a core 20 formed of a gas or a vacuum. Optical transmitter 12 emits an optical data signal 22 that has a wavelength below 250 nm. Graphene has a wavelength dependent index of refraction that is below 1 for wavelengths below 250 nm. A vacuum has an index of refraction of 1. Most gases exhibit an index of refraction near 1 due to their gaseous nature. Table 1 below provides a listing of various gases and their index of refraction as reported in scientific literature demonstrating that the gases have an index of refraction near, but greater than, 1. This listing of gases in Table 1 is merely exemplary. Other gases not listed in Table 1 may be used as the gas forming the core 20 of graphene optical fiber 16. The gas forming the core 20 of graphene optical cable 16 may be a natural gas, an elemental gas, a compound gas, an artificial gas, a synthetic gas, a noble gas, air, or a nitrogen gas. Optical transmitter 12 emits light data signal 22 into graphene optical cable 16. Light data signal 22 has a wavelength of less than 250 nm. As light data signal 22 has a wavelength of less than 250 nm, graphene cylinder 18 has an index of refraction less than 1. As the core 20 of graphene optical fiber 16 is formed of a vacuum or gas having an index of refraction of 1 or greater than 1, light data signal 22 is transmitted through graphene optical cable 16 by means of total internal reflection to optical receiver 14. Optical receiver 14 receives light data signal 22 and converts the light data signal into an electrical data signal. Together, core 20 formed of a vacuum or a gas and graphene cylinder 18 as cladding form the graphene optical cable 16, also called a graphene optical fiber. Graphene is an impermeable membrane to even the smallest atoms, thereby maintaining the atmosphere of a vacuum or gas within the graphene cladding 18. Although it is only one atom thick, an interesting property of graphene is its impermeability. Graphene's p-orbitals forms a dense, delocalized cloud that blocks the gap within its aromatic rings. This creates a repelling field, which does not allow even the smallest molecules, like hydrogen and helium, to pass through even when 1-5 atm pressure difference is imposed across its atomic thickness at room temperature. The ability to withstand such pressure differences (6 atm) in graphene is a result of its high strength (breaking strength=42 N/m) and Young's modulus (1 TPa), which retains the structural integrity of graphene. Thus, a graphene cylinder can maintain a core made of a vacuum or gas when each end of the graphene cylinder 18 is sealed. A further discussion on graphene's impermeability is provided in the following scientific article hereby incorporated by reference: Vikas, Berry. *Impermeability of graphene and its applications*. Carbon (2013), http://dx.doi.org/10.1016/j.carbon.2013.05.052. Graphene cylinder 18 may be sealed by bonding it to both optical transmitter 12 and optical receiver 14. A gas or vacuum can be produced within graphene cylinder 18 by placing all components to be assembled (i.e. the optical transmitter 12, optical receiver 14 and graphene cylinder 18) within an assembly chamber having an ambient atmosphere that is either a vacuum or gas. The ambient atmosphere of a vacuum or gas will exist within graphene cylinder 18 when it has both ends open to the ambient atmosphere prior to assembly. Once graphene cylinder 18 is bonded to optical transmitter 12 and optical receiver 14, the atmosphere of a gas or a vacuum within graphene cylinder 18 will be maintained regardless of the atmosphere external to the assembly of the optical transmitter 12, optical receiver 14 and graphene cylinder 18. In one embodiment, graphene cable 16 is formed of a graphene cylinder 18 that is attached to optical transmitter 12 and optical receiver 14 in such a manner as to seal the vacuum or gas within cable 16. Alternatively, graphene cable 16 may be formed of graphene cylinder 18 and graphene end surfaces 19 that seal the end openings of graphene cylinder 18, thereby forming a graphene capsule. Graphene cylinder 18 is formed of an atomically contiguous lattice of covalently-bonded carbon atoms. Graphene end surfaces 19 are formed of an atomically contiguous lattice of covalently-bonded carbon atoms. When graphene cylinder 18 is bonded to graphene end surfaces 19, a graphene capsule is formed that fully encapsulates core 20 on all sides. When core 20 is fully encapsulated by the graphene capsule formed of graphene cylinder 18 and graphene end surfaces 19, the impermeability of the graphene capsule preserves the vacuum or atmosphere of gas forming core 20.

TABLE 1

| GAS | REFRACTIVE INDEX |
| --- | --- |
| AIR | 1.000293 |
| CARBON DIOXIDE | 1.000449 |
| ARGON | 1.000281 |
| CARBON MONOXIDE | 1.000338 |
| HELIUM | 1.000035 |
| METHANE | 1.000444 |
| NITROGEN | 1.000298 |
| OXYGEN | 1.000271 |
| HYDROGEN | 1.000132 |

Figure 3:
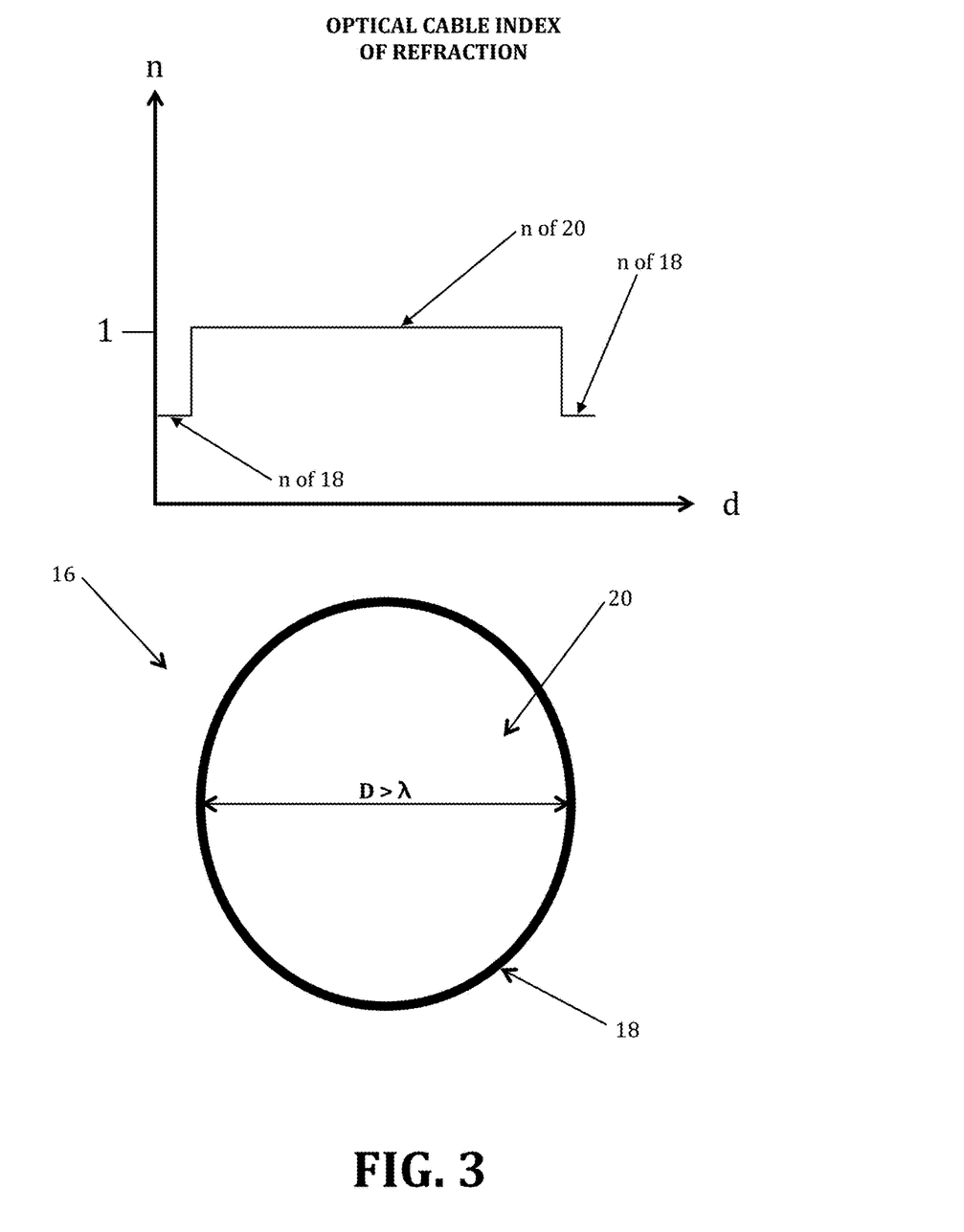
FIG. 3 illustrates a cross-section of graphene optical cable along with an index of refraction profile for the graphene optical cable.

FIG. 3 illustrates a cross-section of graphene optical cable 16 along with an index of refraction profile for graphene optical cable 16. Graphene optical cable 16 is formed of a core 20 surrounded by cladding 18. Cladding 18 has an index of refraction less than core 20, thereby enabling graphene optical cable 16 to transmit light data signals through total internal reflection of the light data signals within core 20. Cladding 18 is formed of a graphene cylinder 18 having an inner diameter D. In order to transmit light data signals, graphene cylinder 18 has an inner diameter D that is larger than, or equal to, the wavelength $\lambda$ of the light data signal. Graphene cylinder 18, which may also be a large diameter carbon nanotube, has an index of refraction below 1 for wavelengths of light below 250 nm. For deep-UV C signals 22 that range from 100 nm to 250 nm, graphene cylinder may have an exemplary inner diameter range from 100 nm to 300 nm depending upon the wavelength of the transmitted data signal. A graphene cylinder, also referred to as a Carbon NanoTube (CNT), having an inner diameter up to 200 nm-300 nm may be fabricated by a variety of means including by a noncatalytic Chemical Vapor Deposition (CVD) in a porous alumina template (See the following paper hereby incorporated by reference: A. Bazilevsku, K. Sun, A. Yarin, C. Megardis. *Room-temperature, open-air, wet intercalation of liquids, surfactants, polymers and nanoparticles within nanotubes and microchannels.* J. Mater. Chem., 2008, 18, 696-702). The inner diameter D of cylinder 18 is greater than, or equal to, the wavelength λ of the transmitted signal (D≥λ). FIG. 3 includes an optical cable index of refraction (n) profile. As the core 20 of optical cable 16 is formed of a vacuum or a gas, the index of refraction of core 20 is either 1 or just barely greater than 1 as gases have an index of refraction just slightly greater than a vacuum. Graphene cylinder 18 on the other hand has an index of refraction below 1 for light wavelengths in the UVC spectrum below 250 nm. As graphene cylinder 18 has a lower index of refraction (n) than core 20 that is formed of a gas or vacuum, deep-UV light signals having a wavelength below 250 nm are transmitted through optical fiber cable 16 by means of total internal reflection. A variety of features of graphene optical cable 16 make it desirable for use as interconnect within a microchip or between cores on a System-On-Chip. The use of deep-UV light signals less than 250 nm reduces the diameter of the core D to a minimal size compared to commonly used infrared wavelengths. Further, the use of a graphene tube 18 for the cladding layer dramatically reduces the thickness of the cladding layer down to a layer one atom thick, or two or multiple atom layers thick. Graphene tube 18 may be formed of a monolayer of graphene. Graphene tube 18 may be formed of bi-layer graphene. Graphene tube 18 may also be formed of multilayer graphene.

Figure 4:
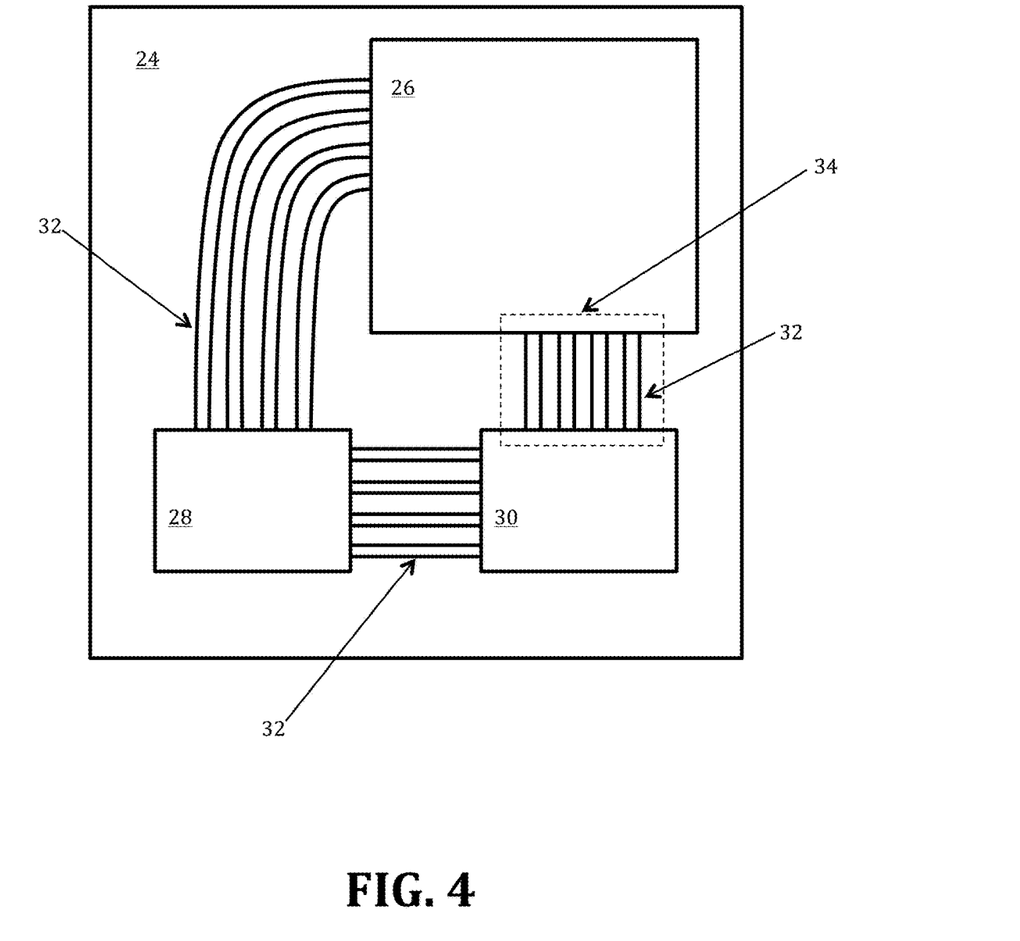
FIG. 4 illustrates a System-On-Chip (SOC) having three separate cores that are in digital communication with each other through optical interconnect formed by deep-UV optical circuits that include graphene optical cables.

FIG. 4 illustrates a System-On-Chip (SOC) 24 having three separate cores 26, 28 and 30 that are in digital communication with each other through optical interconnect 32 formed by deep-UV optical circuits 10 that include graphene optical cables 16. Optical interconnect 32 between core 26 and 28 is formed of 4 pairs of bidirectional communication lines, each of which is formed of two graphene optical cables 16. The lines in the pairs of graphene optical cables 16 form an inbound and outbound data transmission line. As a single graphene optical circuit 10 can transmit data in only one direction, a pair of graphene optical circuits 10 is required to form a bidirectional communication line. Cores 28 and 30 are similarly formed of 4 bidirectional communication lines, each of which is formed of two graphene optical circuits 10. Cores 30 and 26 are similarly formed of 4 pairs bidirectional communication lines, which are each formed of a pair of graphene optical circuits 10. It is highly desirable to utilize graphene optical cables 16 as interconnect between cores 26, 28 and 30 on SOC 24. Increasingly, metal interconnect limits the performance of electronic devices as transistors continue to grow smaller. Replacing metal interconnect with optical interconnect 32 provides improved power, latency, and bandwidth performance to match the enhanced scaling of transistors. Further, the use of deep-UV signals across optical interconnect 32 minimizes the diameter of the cores 20 of graphene optical cables 16. In addition, the use of graphene as cladding 18 for graphene optical cables 16 reduces the thickness of the cladding layer 18 to that of a monolayer of graphene, a bi-layer of graphene, or multilayer graphene. Minimizing the overall thickness of graphene optical cables 16 through these features makes graphene optical cables 16 compatible with the engineering drive to minimize the size of electrical components for microchips for increases in performance. An enhanced detailed view 34 of the optical interconnect 32 between cores 26 and 30 is provided below in FIG. 5.

Figure 5:
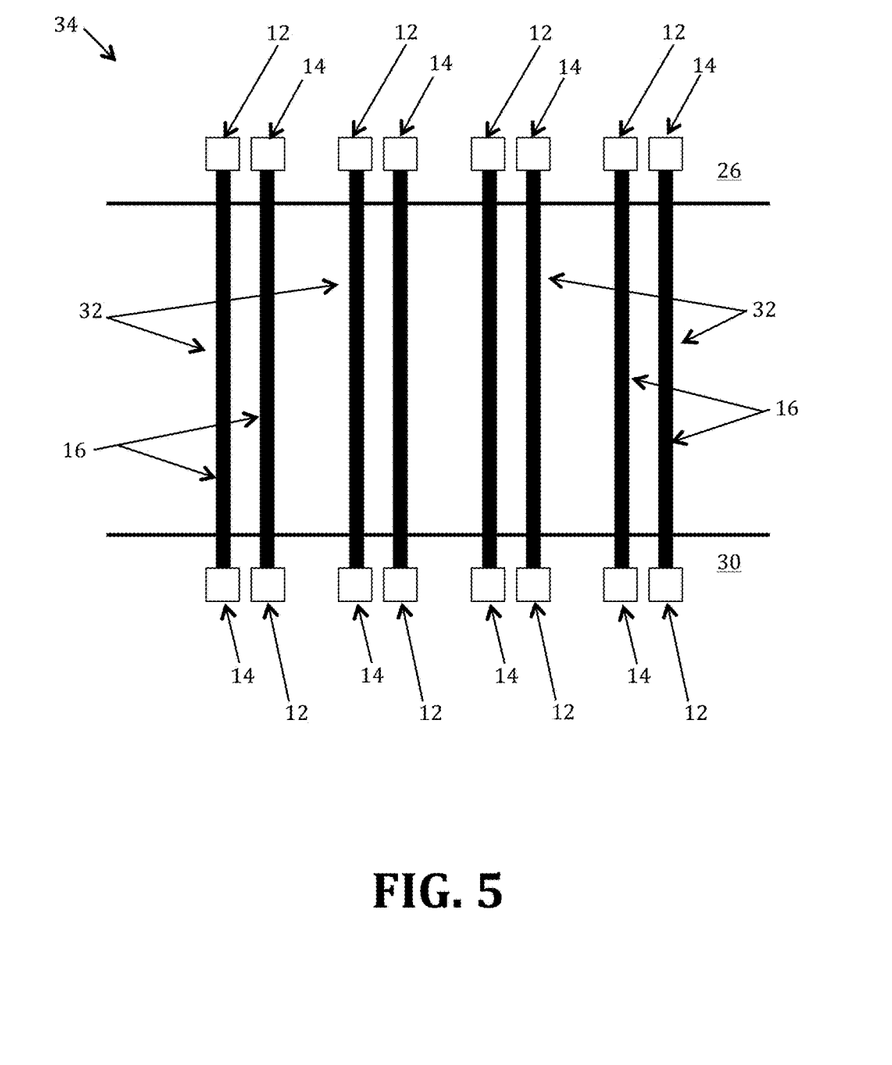
FIG. 5 illustrates a detailed view of an optical interconnect junction between two cores formed by deep-UV optical circuits that include graphene optical cables.

FIG. 5 illustrates a detailed view of an optical interconnect junction between two cores 26 and 30 formed by deep-UV optical circuits that include graphene optical cables 16. The optical interconnect in this exemplary embodiment has four pairs 32 of graphene optical cables 16. Each pair 38 of graphene optical cables 16 forms a bidirectional communication line 38. Each bidirectional communication line 38 is formed of a pair of graphene optical cables 16. Each graphene optical cable 16 is coupled to an optical transmitter 12 and an optical receiver 14. Note that in each single pair of graphene optical cables 16, the optical transmitter 12 and optical receivers 14 are on opposite sides to enable bidirectional communications across a single cable pair 32.

Figure 6:
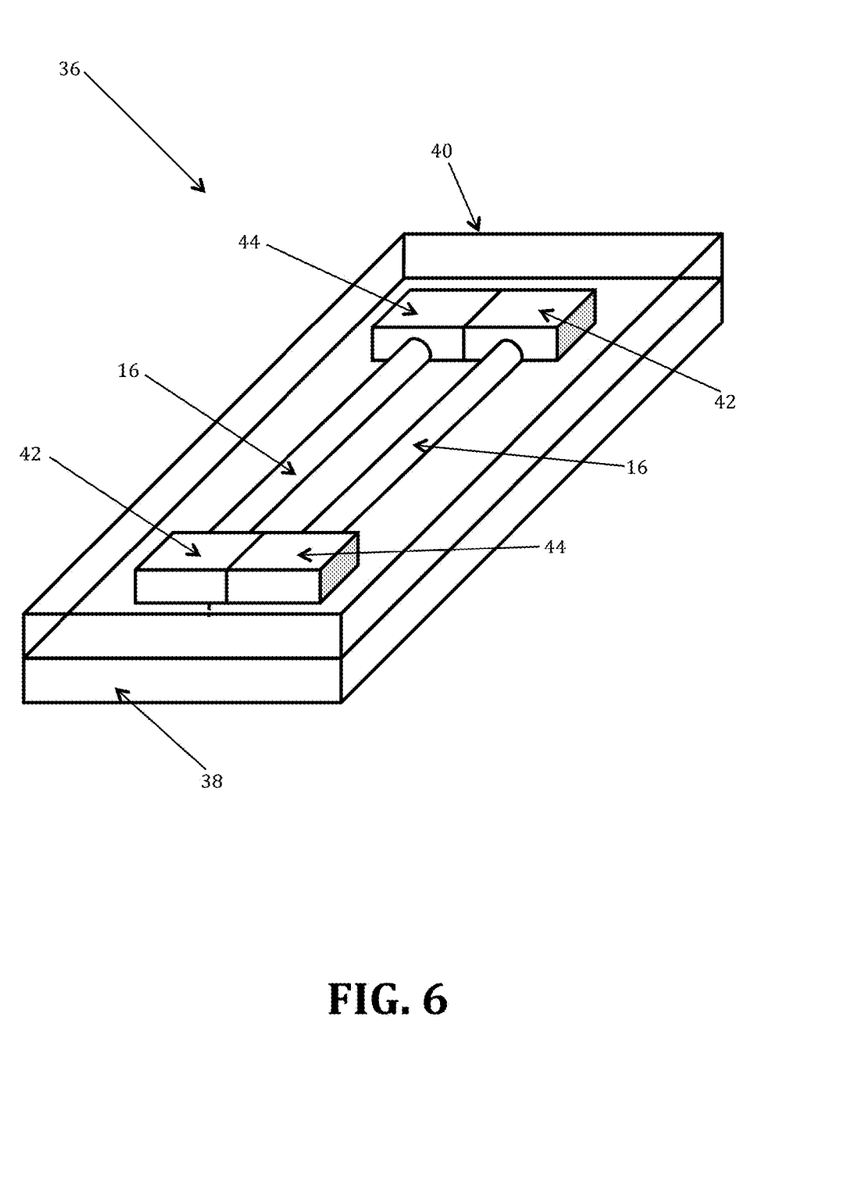
FIG. 6 illustrates a detailed view of microchip having internal interconnect formed of deep-UV optical circuits that include graphene optical cables.

FIG. 6 illustrates a detailed view of microchip 36 having internal interconnect formed of deep-UV optical circuits that include graphene optical cables 16. Microchip 36 includes a substrate 38. A dielectric filler layer 40 is deposited on top of substrate 38. Before dielectric filler layer 40 is deposited on top of substrate 38, a pair of graphene optical circuits are formed on substrate 38. Deep-UV laser diodes 42 are formed on substrate 38. Deep-UV photo-detectors 44 are also formed on substrate 38. Graphene optical cables 16 connect deep-UV laser diode 42 to deep-UV photo-detector 44. Together this pair of graphene optical cables 16 coupled to deep-UV laser diodes 42 and deep-UV photo-detectors 44 form one bidirectional communications line. This bidirectional communications line functions as an intrachip optical communications line within microchip 36. This bidirectional communications lines formed of this pair of graphene optical cables 16 coupled to deep-UV laser diodes 42 and deep-UV photo-detectors 44 connects arrays of transistors and other semiconductor devices within microchip 36 to facilitate high speed high bandwidth data transmission.

Figure 7:
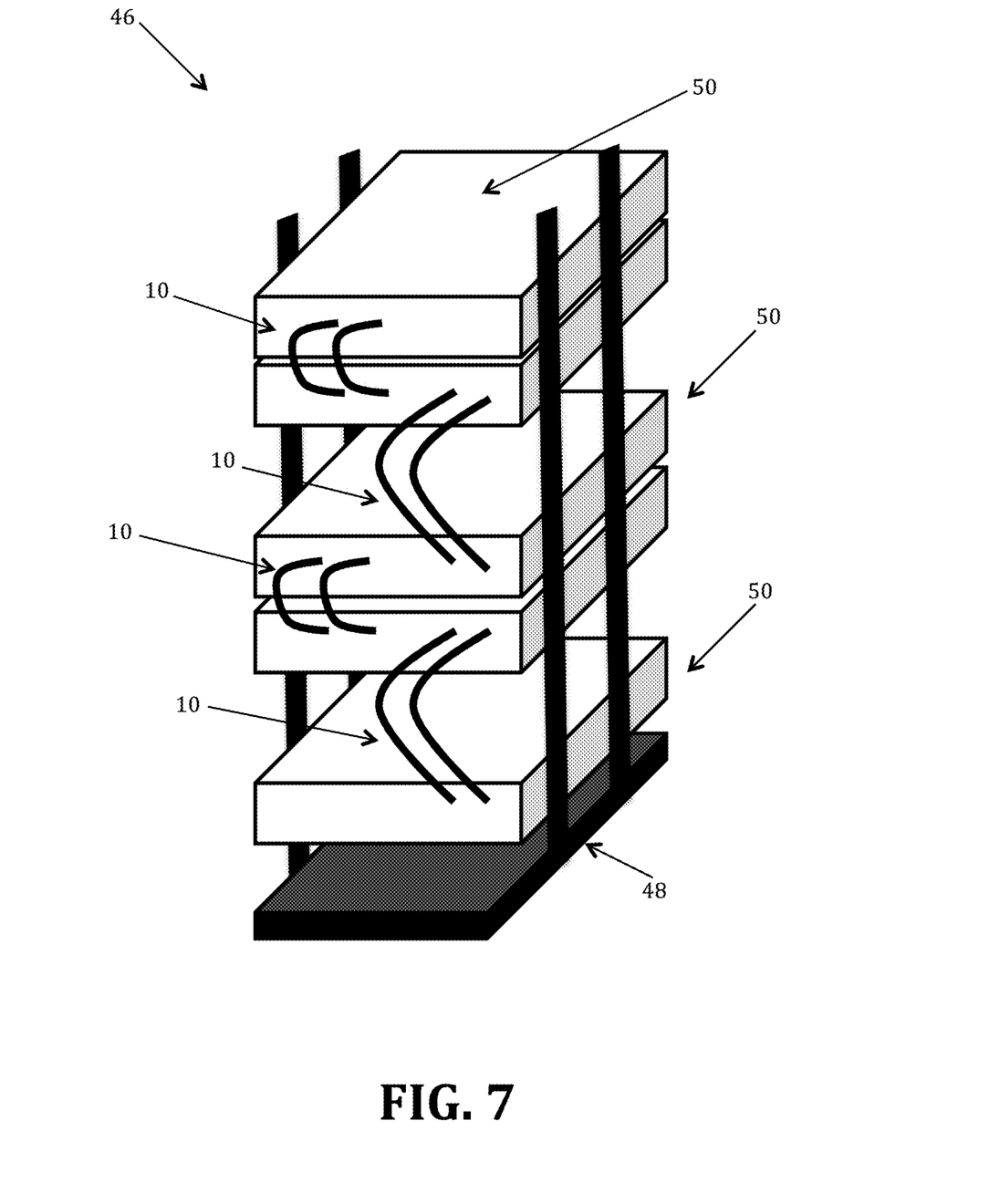
FIG. 7 illustrates a detailed view of a rack of servers coupled to each other through the use of deep-UV optical circuits that include graphene optical cables.

FIG. 7 illustrates a detailed view of group of racked devices 46 coupled to each other through the use of deep-UV optical circuits 52 that include graphene optical cables 16. Group of racked devices 46 includes a rack frame 48 that supports a variety of racked devices 50. Racked devices 50 may be servers, storage arrays, or other conventional electrical computer processing, storage, and communications devices. Racked devices 50 are placed in bidirectional communication with each other through the use of deep-UV optical circuits 10. Each deep-UV optical circuit includes a pair of optical transmitters 12 and optical receivers 14 that are in optical communication with each other through graphene optical cables 16. The use of deep-UV optical circuits 10 allows for bidirectional communication between devices 50.

Figure 8:
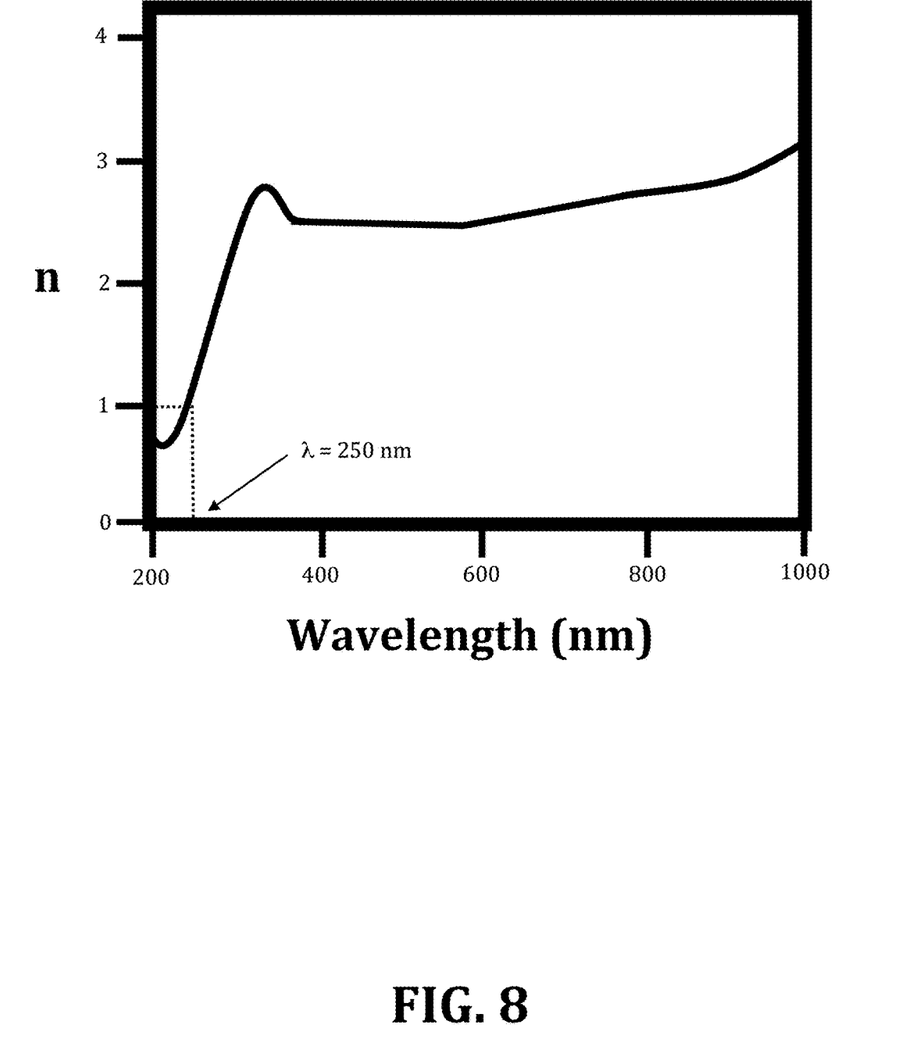
FIG. 8 illustrates a graph depicting the wavelength dependence of the index of refraction (n) for graphene.

FIG. 8 illustrates a graph depicting the wavelength dependence of the index of refraction (n) for graphene. The wavelength dependence of the index of refraction (n) for graphene is reported in the following references hereby incorporated by reference: Alex Gray, Mehdi Balooch, Stephane Allegret, Stefan De Gendt, and Wei-E Wang. *Optical Detection and Characterization of Graphene by Broadband Spectrophotometry*; Journal of Applied Physics 104, 053109 (2008); Efraín Ochoa-Martínez, Mercedes Gabás, Laura Barrutia, Amaia Pesquera, Alba Centeno, Santiago Palanco, Amaia Zurutuza and Carlos Algora.

*Determination of a Refractive Index and an Extinction Coefficient of Standard Production of CVD-Graphene*. Nanoscale, 2015, 7, 1491-1500; and J. W. Webber, V. E. Calado, and M. C. M. van de Sanden. *Optical constants of graphene measured by spectroscopic ellisometry*. Applied Physics Letters 97, 091904 (2010). Graphene exhibits a wavelength dependent index of refraction (n). Graphene exhibits an index of refraction (n) less than 1 (one) for wavelengths of light below approximately 250 nm, which is primarily in the Ultra-violet C (UVC) range of the spectrum. As graphene exhibits an index of refraction (n) less than 1 in the UVC spectrum below 250 nm, a vacuum or a gas with an index of refraction of 1 or more may function as a core 20 within a graphene cylinder for a graphene optical cable 16 by transmitting deep-UV light having a wavelength below 250 nm along the cable 16 through total internal reflection.

A deep-UV optical circuit 10 is disclosed in the present application that includes a laser or laser-diode 12 emitting light wavelengths ($\lambda$) below 250 nm. The circuit 10 also includes a graphene optical cable 16 formed of an optic core 20 formed of a gas or vacuum having an index of refraction ranging between 1.000 and 1.002 and a cladding layer 18 formed of a graphene cylinder 18 made of a contiguous lattice of covalently-bonded carbon atoms surrounding optic core 20. The circuit 10 also includes an optical detector circuit 14 configured to detect the light. The graphene optical cable 16 optically couples the laser 12 to the optical detector circuit 14, where the optical cable 16 transmits light wavelengths ($\lambda$) below 250 nm as graphene has an index of refraction less than 1 for light wavelengths ($\lambda$) below 250 nm. The graphene cylinder 18 has an inner diameter D that varies between 157 nm and 300 nm, where diameter D$\geq\lambda$ and $\lambda$ varies between 157 nm to 250 nm. Alternatively, the graphene cylinder 18 has an inner diameter D that varies between 200 nm and 250 nm, where diameter D$\geq\lambda$ and $\lambda$ varies between 200 nm to 250 nm. The gas that optionally forms the core may be a natural gas, an elemental gas, a compound gas, an artificial gas, a synthetic gas, a noble gas, air, or a nitrogen gas. The graphene cylinder 18 has a armchair, chiral, or zig-zag configuration. The contiguous lattice of covalently-bonded carbon atoms form a monolayer of graphene. Alternatively, the contiguous lattice of covalently-bonded carbon atoms form multilayer graphene having a thickness ranging from 0.345 nm to 1.100 nm, which is the thickness of three layers of graphene.

An optical graphene fiber 16 for deep-UV light is disclosed that includes an optic core 20 formed of a gas or vacuum having an index of refraction between 1.000 and 1.002 and a cladding layer 18 formed of a graphene cylinder made of a contiguous lattice of covalently-bonded carbon atoms surrounding optic core 20, where the optical cable 16 transmits light wavelengths ($\lambda$) less than 250 nm as graphene has an index of refraction less than 1 for light wavelengths ($\lambda$) below 250 nm. The graphene cylinder 18 has an inner diameter D that varies between 157 nm and 300 nm, wherein inner diameter D$\geq\lambda$ and $\lambda$ varies between 157 nm to 250 nm. Alternatively, the graphene cylinder 18 has a diameter D that varies between 200 nm and 250 nm, wherein inner diameter D$\geq\lambda$ and $\lambda$ varies between 157 nm to 250 nm. The gas that optionally forms the core may be a natural gas, an elemental gas, a compound gas, an artificial gas, a synthetic gas, a noble gas, air, a nitrogen gas. The graphene cylinder 18 has a armchair, chiral, or zig-zag configuration. The contiguous lattice of covalently-bonded carbon atoms form a monolayer of graphene. Alternatively, the contiguous lattice of covalently-bonded carbon atoms form multilayer graphene having a thickness ranging from 0.345 nm to 1.100 nm.

An optical graphene cable 16 for deep-UV light is disclosed that includes an optic core 20 formed of a gas or vacuum having an index of refraction between 1.000 and 1.002 and a cladding layer 18 formed of a graphene capsule encapsulating said optic core on all sides, where the optical cable transmits light wavelengths ($\lambda$) less than 250 nm as graphene has an index of refraction less than 1 for light wavelengths ($\lambda$) below 250 nm. The graphene capsule 18 has an inner diameter D that varies between 100 nm and 300 nm, wherein inner diameter D$\geq\lambda$ and $\lambda$ varies between 100 nm to 250 nm. The gas that optionally forms the core may be a natural gas, an elemental gas, a compound gas, an artificial gas, a synthetic gas, a noble gas, air, or a nitrogen gas. The graphene capsule 18 has a armchair, chiral, or zig-zag configuration. The graphene capsule 18 may be formed of a contiguous lattice of covalently-bonded carbon atoms that form a monolayer of graphene. Alternatively, the graphene capsule 18 may be formed of a contiguous lattice of covalently-bonded carbon atoms that form a graphene layer having a thickness ranging from 0.345 nm to 1.100 nm. The optical graphene cable 16 for deep-UV light may also include a laser, or laser diode, 12 emitting deep-UV light 22 having wavelength ($\lambda$) varying between 100 nm and 250 nm and an optical detector circuit configured to detect the deep-UV light, where the graphene optical cable 16 optically couples the laser 12 to the optical detector circuit 14.

While the invention has been shown and described with reference to a particular embodiment thereof, it will be understood to those skilled in the art, that various changes in form and details may be made therein without departing from the spirit and scope of the invention.

I claim:

1. A deep-UV optical circuit, comprising:
   a laser emitting light wavelengths ($\lambda$) below 250 nm;
   a graphene optical cable comprising:
      an optic core formed of a vacuum having an index of refraction of 1.000;
      a cladding layer formed of a graphene cylinder that is sealed at both ends to maintain the vacuum within said graphene cylinder regardless of the atmosphere external to said graphene optical cable, said graphene cylinder consisting of a contiguous lattice of covalently-bonded carbon atoms surrounding said optic core; and
   an optical detector circuit configured to detect the light, wherein said graphene optical cable optically couples said laser to said optical detector circuit, wherein said optical cable transmits light wavelengths ($\lambda$) below 250 nm as graphene has an index of refraction less than 1 for light wavelengths ($\lambda$) below 250 nm.

2. The deep-UV optical circuit of claim 1, wherein said graphene cylinder has an inner diameter D between 157 nm and 300 nm, wherein inner diameter D$\geq\lambda$ and $\lambda$ varies between 157 nm to 250 nm.

3. The deep-UV optical circuit of claim 1, wherein said graphene cylinder has an inner diameter D between 200 nm and 250 nm, wherein inner diameter D$\geq\lambda$ and $\lambda$ varies between 200 nm to 250 nm.

4. The deep-UV optical circuit of claim 1, wherein said graphene cylinder is sealed at both ends with graphene end surfaces that are bonded to each end of said graphene cylinder, thereby forming a graphene capsule, wherein said graphene end surfaces are formed of a contiguous lattice of covalently-bonded carbon atoms.

5. The deep-UV optical circuit of claim 1, wherein said graphene cylinder is sealed at its first end by bonding that end to said laser, wherein said graphene cylinder is sealed at its second end by bonding that end to said optical detector circuit.

6. The deep-UV optical circuit of claim 5, wherein said contiguous lattice of covalently-bonded carbon atoms form a monolayer of graphene.

7. The deep-UV optical circuit of claim 5, wherein said contiguous lattice of covalently-bonded carbon atoms form multilayer graphene having a thickness ranging from 0.345 nm to 1.100 nm.

8. An optical fiber for deep-UV light, comprising:
   an optic core formed of a gas having an index of refraction between 1.000 and 1.002; and
   a cladding layer formed of a graphene cylinder that is sealed at both ends to maintain said gas within said graphene cylinder regardless of the atmosphere external to said graphene optical cable, said graphene cylinder consisting of a contiguous lattice of covalently-bonded carbon atoms surrounding said optic core, wherein said optical cable transmits light wavelengths ($\lambda$) less than 250 nm as graphene has an index of refraction less than 1 for light wavelengths ($\lambda$) below 250 nm.

9. The optical fiber for deep-UV light of claim 8, wherein said graphene cylinder has an inner diameter D between 157 nm and 300 nm, wherein diameter D≥$\lambda$ and $\lambda$ varies between 157 nm to 250 nm.

10. The optical fiber for deep-UV light of claim 8, wherein said graphene cylinder has an inner diameter D between 200 nm and 250 nm, wherein inner diameter D≥$\lambda$ and $\lambda$ varies between 157 nm to 250 nm.

11. The optical fiber for deep-UV light of claim 9, wherein said gas is selected from the group consisting of an artificial gas, a synthetic gas, a noble gas, air, a nitrogen gas.

12. The optical fiber for deep-UV light of claim 11, wherein said graphene cylinder is sealed at both ends with graphene end surfaces that are bonded to each end of said graphene cylinder, thereby forming a graphene capsule, wherein said graphene end surfaces are formed of a contiguous lattice of covalently-bonded carbon atoms.

13. The optical fiber for deep-UV light of claim 11, wherein said graphene cylinder is sealed at its first end by bonding that end to said laser, wherein said graphene cylinder is sealed at its second end by bonding that end to said optical detector circuit.

14. The optical fiber for deep-UV light of claim 12, wherein said contiguous lattice of covalently-bonded carbon atoms form multilayer graphene having a thickness ranging from 0.345 nm to 1.100 nm.

15. A microchip, comprising:
   a substrate;
   a deep-UV laser diode on said substrate;
   a deep-UV photo-detector on said substrate;
   a graphene optical cable optically connecting said deep-UV laser to said deep-UV photodetector, said graphene optical cable comprising:
      an optic core formed of a gas or vacuum having an index of refraction ranging between 1.000 and 1.002;
      a cladding layer formed of a graphene cylinder that is sealed at both ends to maintain the gas or vacuum within said graphene cylinder regardless of the atmosphere external to said graphene optical cable, said graphene cylinder consisting of a contiguous lattice of covalently-bonded carbon atoms surrounding said optic core; and
   a dielectric filler layer deposited on top of said substrate covering said deep-UV-laser diode, said deep-UV photo-detector, and said graphene optical cable.

16. The microchip of claim 15, wherein said graphene cylinder is sealed at both ends with graphene end surfaces that are bonded to each end of said graphene cylinder, thereby forming a graphene capsule, wherein said graphene end surfaces are formed of a contiguous lattice of covalently-bonded carbon atoms.

17. The microchip of claim 15, wherein said graphene cylinder is sealed at its first end by bonding that end to said deep-UV laser diode, wherein said graphene cylinder is sealed at its second end by bonding that end to said deep-UV photo-detector.

18. The microchip of claim 16, wherein said gas is selected from the group consisting of natural gas, an elemental gas, a compound gas, an artificial gas, a synthetic gas, a noble gas, air, a nitrogen gas.

* * * * *